United States Patent Office 2,839,520
Patented June 17, 1958

2,839,520

COBALTIFEROUS AZO DYESTUFFS

Reinhard Neier, Basel, Switzerland, assignor, by mesne assignments, to Saul & Co., Newark, N. J., as nominee of Fidelity Union Trust Company, executive trustee under Sandoz Trust No Drawing. Application December 2, 1955
Serial No. 550,790

Claims priority, application Switzerland
December 15, 1954

6 Claims. (Cl. 260—145)

The present invention relates to cobaltiferous dyestuffs which are useful as dyestuffs for wool, silk and synthetic polyamide fibers.

More particularly, the invention has especial relation to a group of cobaltiferous azo dyestuffs which correspond to the general formula

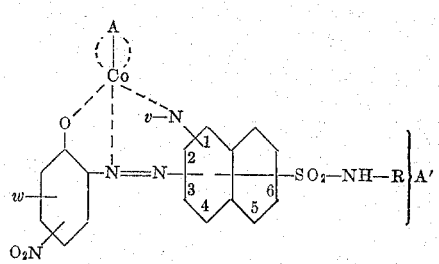

(I)

wherein $v$ represents hydrogen or methyl,
$w$ represents hydrogen, chlorine, methyl or nitro, and
R represents 3-methoxypropyl or 2'-hydroxypropyl, wherein the —N—$v$ group is in the 1 or 2 position of the naphthalene nucleus and in ortho-position to the azo group, the —SO₂—NH—R group is in the 4, 5 or 6 position of the naphthalene nucleus, and wherein A stands for A', or for a radical different from A' but of the same general formula, or for the radical of a monoazo compound obtained by coupling a diazotized 2-amino-1-hydroxybenzenesulfonic acid amide with 2-(3'-chloro)-phenylaminonaphthalene, or for the radical of a monoazo compound of the general formula

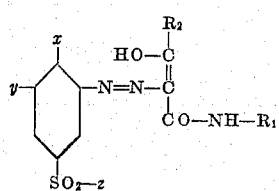

(II)

wherein $x$ represents hydroxy or methoxy,
$y$ represents hydrogen, methyl or acetylamino,
$z$ represents low-molecular alkyl or the radical of an aliphatic, cycloaliphatic, araliphatic, aromatic or heterocyclic primary or secondary amine which may carry further non-ionogenic substituents,
R₁ represents an alkyl radical containing not less than 6 and not more than 18 carbon atoms, and
R₂ represents an alkyl or aryl radical.

The new cobaltiferous azo dyestuffs possess outstanding neutral affinity and dye wool, silk, leather and in particular synthetic polyamide fibres from neutral to weakly acid dyebaths in valuable level, full shades ranging from blue and green to olive and having excellent fastness to light and very good fastness to washing and milling. They are prepared by treating with a cobalt-yielding agent 2 mols of a monoazo compound of the general formula

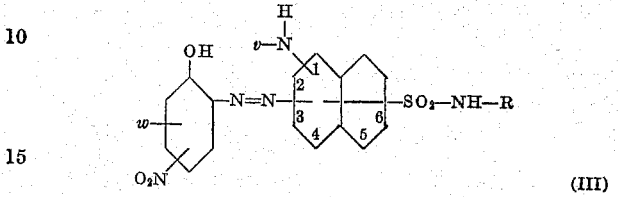

(III)

the 2 mols being of identical monoazo compound or of different monoazo compounds of Formula III,
wherein $v$ represents hydrogen or methyl,
$w$ represents hydrogen, chlorine, methyl or nitro, and
R represents 3-methoxypropyl or 2'-hydroxypropyl, and wherein the —NH—$v$ group is in the 1 or 2 position of the naphthalene nucleus and in the ortho-position to the azo group, and the —SO₂—NH—R group is in the 4, 5 or 6 position of the naphthalene nucleus, or 1 mol of a monoazo compound of general Formula III and 1 mol of a monoazo compound obtained by coupling a diazotized 2-amino-1-hydroxybenzene sulfonic acid amide with 2-(3'-chloro)-phenylaminonaphthalene, or 1 mol of a monoazo compound of general formula III and 1 mol of a monoazo compound of the general formula

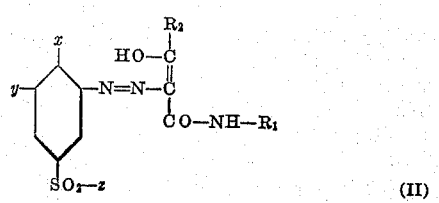

(II)

wherein $x$ represents hydroxy or methoxy,
$y$ represents hydrogen, methyl or acetylamino,
$z$ represents low-molecular alkyl or the radical of an aliphatic, cycloaliphatic, araliphatic, aromatic or heterocyclic primary or secondary amine which may carry further non-ionogenic substituents,
R₁ represents an alkyl radical containing not less than 6 and not more than 18 carbon atoms, and
R₂ represents an alkyl or aryl radical.

in such a way the resulting dyestuff contains to 1 mol of the monoazo compound approximately ½ gram atom of cobalt in complex combination.

The metallization of the mixtures of the monoazo compounds is carried out preferably with cobaltous acetate, cobaltous formiate and cobaltous sulfate in aqueous suspension, in solution, or in an organic medium, for example formamide, or in an aqueous organic medium, e. g. in the concentrated aqueous solution of an alkaline metal salt of a low-molecular aliphatic monocarboxylic acid. In the latter case insoluble metal compounds may also be employed, for example cobalt hydroxide and cobalt carbonate. Metallization in an aqueous caustic alkaline medium, effected by the addition of the metal salts in the presence of derivatives which are able to form, with cobalt, complex compounds soluble in a caustic alkaline medium, e. g. tartaric acid, citric acid or lactic acid, is particularly advantageous. When the symbol $x$ in the monoazo compounds of general Formula II represents methoxy, metallization must be conducted with simultaneous splitting off of the methoxy group.

Since the cobaltiferous azo dyestuffs obtained according to the invention contain to 1 mol of the monoazo compound approximately ½ gram atom of cobalt in complex combination, it is advisable to carry out metallization with a quantity of cobalt-yielding agent containing less than two but at least one atom of cobalt to two molecules of the monoazo compound. The dyestuffs are usually precipitated from the metallizing solution by an addition of salt, then filtered off, washed if desired, and finally dried.

The new cobaltiferous azo dyestuffs are either symmetrical dyestuffs or mixtures of symmetrical and asymmetrical dyestuffs in which the asymmetrical dyestuff forms the main constituent. The dyestuff mixtures obtained according to the invention are distinguished from the mixtures produced by simple mixing of 1:2 complex compounds obtained by metallization of the individual monoazo compounds, by the brighter shades of their dyeings. Furthermore, the dyestuff mixtures according to the invention behave in exhaustion tests like homogeneous dyestuffs, which is not the case with mixtures produced by mechanical means.

The following examples illustrate the invention without limiting its scope. All parts and percentages specified therein are by weight; temperatures are in degrees centigrade.

EXAMPLE 1

22.2 parts of the monoazo compound obtained by coupling diazotized 2-amino-1-hydroxy-5-nitrobenzene with 1-aminonaphthalene-4-sulfonic acid-(2'-hydroxy)-propylamide are dissolved in 600 parts of water with the aid of 4 parts of sodium hydroxide. To the solution is added a mixture of 7.1 parts of crystallized cobaltous sulfate, 2.8 parts of sodium hydroxide and 63 parts of a 3% aqueous solution of tartaric acid, and the mass boiled on the reflux until such time as the metal-free monoazo compound is no longer indicated. The cobaltiferous azo dyestuff thus formed is precipiated from the metallizing solution by an addition of sodium chloride, then filtered off, dried and ground. It is a dark powder which dyes wool, silk, leather and synthetic polyamide fibres in blue shades and corresponds to formula

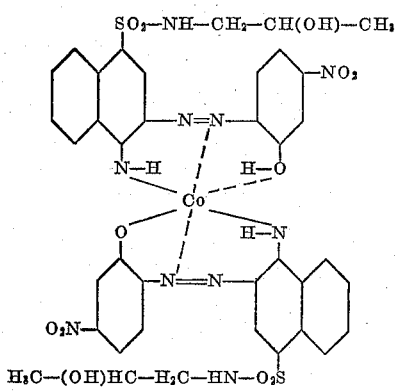

In Table 1 further cobaltiferous azo dyestuffs are enumerated. They are characterized by the diazo and azo components used for the production of the monoazo compounds and by the shades of their dyeings on wool.

Table 1

| Ex. No. | Diazo component | Azo component | Shade of the dyeing of the cobalt complex compound on wool |
|---|---|---|---|
| 2 | 2-amino-1-hydroxy-5-nitrobenzene. | 2-aminonaphthalene-6-sulfonic acid-(2'-hydroxy)-propylamide. | Greenish blue. |
| 3 | ___do___ | 2-aminonaphthalene-5-sulfonic acid-(2'-hydroxy)-propylamide. | Do. |
| 4 | 2-amino-1-hydroxy-4-chloro-6-nitrobenzene. | 2-aminonaphthalene-6-sulfonic acid-(2'-hydroxy)-propylamide. | Blue-grey. |
| 5 | 2-amino-1-hydroxy-4,6-dinitrobenzene. | ___do___ | Greenish grey. |
| 6 | 2-amino-1-hydroxy-4-nitro-6-methylbenzene. | 2-methylaminonaphthalene-6-sulfonic acid-(3'-methoxy)-propylamide. | Blue-green. |

EXAMPLE 7

11.1 parts of the monoazo compound produced by coupling diazotized 2-amino-1-hydroxy-5-nitrobenzene with 1-aminonaphthalene-4-sulfonic acid-(2'-hydroxy)-propylamide and 11.3 parts of the monoazo compound obtained by coupling diazotized 2-amino-1-hydroxybenzene-4-sulfonic acid amide with 2-(3'-chloro)-phenylaminonaphthalene are heated with 7.1 parts of crystallized cobaltous sulfate in 150 parts of formamide at 90–100° until no further metal-free monoazo compound is indicated in the metallizing mass. The cobalt complex compound thus formed is precipitated from the solution by an addition of 20 parts of sodium chloride in 200 parts of water, then filtered off. It is purified by dissolving in water with the aid of sodium hydroxide, renewed precipitation from the solution by means of sodium chloride, and filtering off of the precipitate. When dried and ground the cobaltiferous azo dyestuff is obtained as a dark powder which dyes wool, silk, leather and synthetic polyamide fibres in blue shades.

It is a mixture of three cobaltiferous azo dyestuffs, the main constituent corresponding to the formula

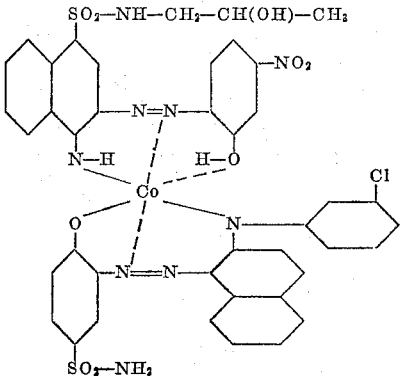

the two other possessing the formulae

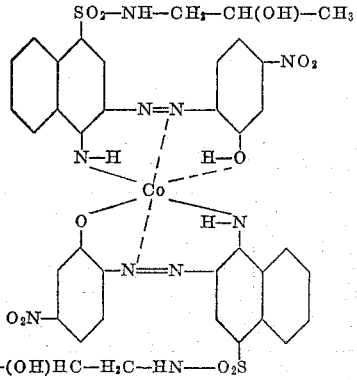

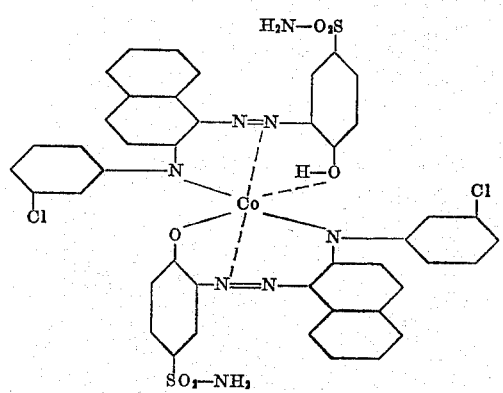

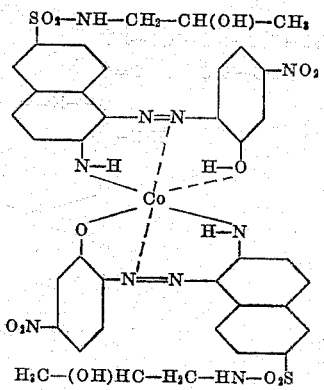

EXAMPLE 8

10.3 parts of the monoazo compound produced by coupling diazotized 2 - amino - 1 - hydroxybenzene-4-sulfonic acid amide with 1 - acetoacetylamino - 2 - ethylhexane and 11.1 parts of the monoazo compound obtained by coupling diazotized 2 - amino - 1 - hydroxy-5-nitrobenzene with 2 - aminonaphthalene - 6 - sulfonic acid - (2' - hydroxy) - propylamide are dissolved with the aid of 4 parts of sodium hydroxide in 600 parts of water. To this solution is added a solution of 7.1 parts of crystallized cobaltous sulfate, 2.8 parts of sodium hydroxide and 63 parts of a 3% aqueous solution of tartaric acid, and the mass boiled on the reflux until the metal-free monoazo compound is no longer indicated. The resulting cobalt complex compound is precipitated by an addition of sodium chloride, and subsequently filtered off, dried and ground. The cobaltiferous azo dyestuff is a dark powder which dyes wool, silk, leather and synthetic polyamide fibres in green shades.

It is a mixture of three cobaltiferous azo dyestuffs, the main constituent corresponding to the formula

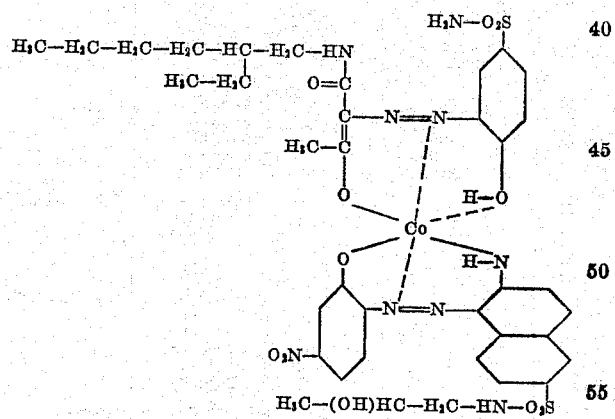

the two other possessing the formulae

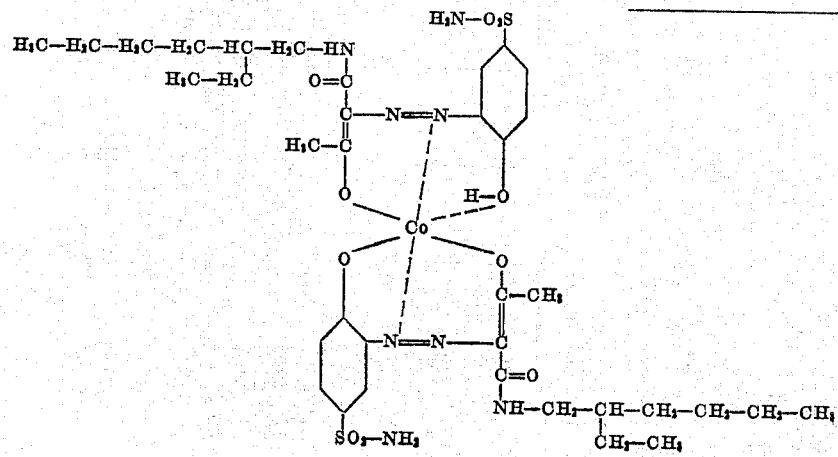

EXAMPLE 9

10.3 parts of the monoazo compound obtained by coupling diazotized 2 - amino - 1 - hydroxybenzene - 4 - sulfonic acid amide with 1-acetoacetylamino-2-ethylhexane and 11.1 parts of the monoazo compound obtained by coupling diazotized 2 - amino - 1 - hydroxy - 5 - nitrobenzene with 1 - aminonaphthalene - 5 - sulfonic acid-(2'-hydroxy)-propylamide are heated with 7.1 parts of crystallized cobaltous sulfate in 150 parts of formamide at 90–100° until no further metal-free monoazo compound is indicated in the metallizing mass. The cobalt complex compound thus formed is precipitated from the metallizing mass by the addition of a solution of 20 parts of sodium chloride and 200 parts of water, and then filtered off. It is purified by dissolving in water with the aid of sodium hydroxide and renewed precipitation from the solution by means of sodium chloride, the precipitate then being filtered off. The dried and ground cobaltiferous azo dyestuff is a dark powder which dyes wool, silk, leather and synthetic polyamide fibres in green shades.

It is a mixture of three cobaltiferous azo dyestuffs, the main constituent corresponding to the formula

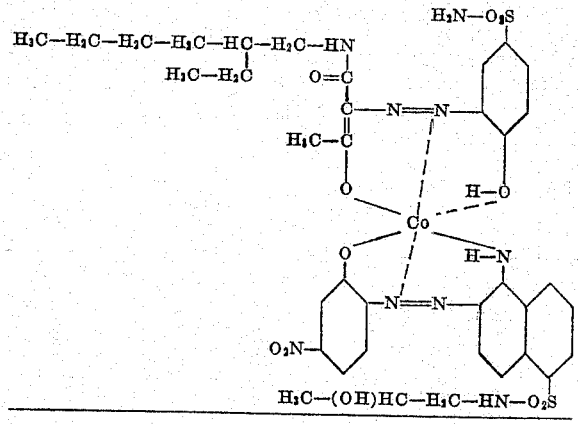

the two other possessing the formulae

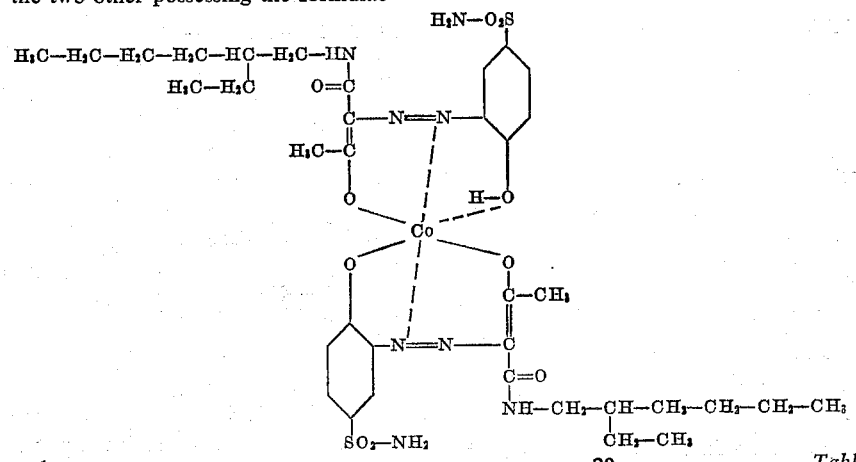

and

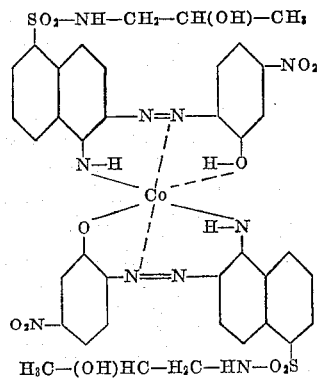

Further cobaltiferous azo dyestuffs can be produced in the above described manner. They are characterized in Table 2 by the monoazo compounds required for their preparation and by the shades of their dyeings on wool. The relative proportions of the monoazo compounds employed may in each instance be varied within wide limits, though in the majority of cases an approximately molecular ratio will be preferred.

Table 2

| Ex. No. | First monoazo compound | Second monoazo compound | Shade of the dyeing of the mixed complex compound on wool |
|---|---|---|---|
| 10 | 2-amino-1-hydroxy-5-nitrobenzene→2-aminonaphthalene-6-sulfonic acid-(2'-hydroxy)-propylamide. | 2-amino-1-hydroxy-benzene-4-sulfonic acid amide→2-(3'-chloro)-phenylamino-naphthalene. | Blue. |
| 11 | 2-amino-1-hydroxy-5-nitrobenzene→2-aminonaphthalene-5-sulfonic acid-(2'-hydroxy)-propylamide. | -----do--------- | Do. |
| 12 | 2-amino-1-hydroxy-5-nitrobenzene→1-aminonaphthalene-4-sulfonic acid-(2'-hydroxy)-propylamide. | 2-amino-1-hydroxy-benzene-5-sulfonic acid amide→2-(3'-chloro)-phenylamino-naphthalene. | Do. |
| 13 | 2-amino-1-methoxy-benzene-4-sulfonic acid amide→1-acetoacetylamino-2-ethylhexane. | 2-amino-1-hydroxy-4-nitrobenzene→2-aminonaphthalene-6-sulfonic acid-(3'-methoxy)-propylamide. | Olive. |
| 14 | 2-amino-1-hydroxy-benzene-4-sulfonic acid amide→1-acetoacetylamino-2-ethylhexane. | 2-amino-1-hydroxy-4-nitrobenzene→2-aminonaphthalene-6-sulfonic acid-(2'-hydroxy)-propylamide. | Do. |
| 15 | -----do--------- | 2-amino-1-hydroxy-5-nitrobenzene→2-aminonaphthalene-6-sulfonic acid-(3'-methoxy)-propylamide. | Green. |

Table 2—Continued

| Ex. No. | First monoazo compound | Second monoazo compound | Shade of the dyeing of the mixed complex compound on wool |
|---|---|---|---|
| 16 | 2-amino-1-hydroxy-benzene-4-sulfonic acid amide→1-acetoacetylamino-2-ethylhexane. | 2-amino-1-hydroxy-5-nitrobenzene→2-aminonaphthalene-5-sulfonic acid-(2'-hydroxy)-propylamide. | Green. |
| 17 | -----do--------- | 2-amino-1-hydroxy-5-nitrobenzene→2-methylaminonaphthalene-6-sulfonic acid-(2'-hydroxy)-propylamide. | Do. |
| 18 | 2-amino-1-hydroxy-benzene-4-sulfonic acid amide→1-acetozcetylamino-1,1-dimethyl-3,3-dimethylbutane. | 2-amino-1-hydroxy-4-chloro-5-nitrobenzene→2-aminonaphthalene-6-sulfonic acid-(2'-hydroxy)-propylamide. | Do. |
| 19 | 2-amino-1-hydroxy-benzene-4-sulfonic acid methylamide→1-acetoacetylamino-octane. | 2-amino-1-hydroxy-4-nitro-6-methyl-benzene→2-aminonaphthalene-6-sulfonic acid-(3'-methoxy)-propylamide. | Olive. |
| 20 | 2-amino-1-hydroxy-benzene-4-sulfonic acid amide→1-acetoacetylamino-2-ethylhexane. | 2-amino-1-hydroxy-5-nitrobenzene→1-aminonaphthalene-5-sulfonic acid-(3'-methoxy)-propylamide. | Green. |
| 21 | 2-amino-1-hydroxy-4-sulfonic acid amide→1-acetoacetylamino-2-ethylhexane. | 2-amino-1-hydroxy-4-nitrobenzene→1-aminonaphthalene-5-sulfonic acid-(3'-methoxy)-propylamide. | Olive-green. |
| 22 | 2-amino-1-hydroxy-benzene-4-sulfonic acid amide→1-acetoacetylamino-2-ethylhexane. | 2-amino-1-hydroxy-4-chloro-6-nitrobenzene→1-aminonaphthalene-5-sulfonic acid-(2'-hydroxy)-propylamide. | Greyish green. |
| 23 | -----do--------- | 2-amino-1-hydroxy-5-nitrobenzene→1-aminonaphthalene-4-sulfonic acid-(2'-hydroxy)-propylamide. | Green. |
| 24 | -----do--------- | 2-amino-1-hydroxy-5-nitrobenzene→1-aminonapththalene-4-sulfonic acid-(3'-methoxy)-propylamide. | Do. |
| 25 | -----do--------- | 2-amino-1-hydroxy-4-nitrobenzene→1-aminonaphthalene-4-sulfonic acid-(3'-methoxy)-propylamide. | Olive-green. |
| 26 | -----do--------- | 2-amino-1-hydroxy-4-chloro-6-nitrobenzene→1-aminonaphthalene-4-sulfonic acid-(2'-hydroxy)-propylamide. | Greyish green. |
| 27 | -----do--------- | 2-amino-1-hydroxy-4,6-dinitrobenzene→1-aminonaphthalene-4-sulfonic acid-(2'-hydroxy)-propylamide. | Olive. |

Table 2—Continued

| Ex. No. | First monoazo compound | Second monoazo compound | Shade of the dyeing of the mixed complex compound on wool |
|---|---|---|---|
| 28 | 2-amino-1-hydroxy-5-nitrobenzene→2-aminonaphthalene-6-sulfonic acid-(2'-hydroxy)-propylamide. | 2-amino-1-hydroxy-benzene-4-sulfonic acid-(2'-methoxy)-ethylamide→1-acetoacetyl-aminohexane. | Green. |
| 29 | 2-amino-1-hydroxy-5-nitrobenzene→1-aminonaphthalene-4-sulfonic acid-(3'-methoxy)-propylamide. | 2-amino-1-hydroxy-benzene-4-sulfonic acid-(2'-hydroxy)-ethylamide→1-acetoacetylamino-1.1-dimethyl-3.3-dimethylbutane. | Do. |
| 30 | 2-amino-1-hydroxy-5-nitrobenzene→2-aminonaphthalene-5-sulfonic acid-(2'-hydroxy)-propylamide. | 2-amino-1-hydroxy-benzene-4-sulfonic acid methylamide→1-acetoacetylamino-octane. | Do. |
| 31 | 2-amino-1-hydroxy-5-nitrobenzene→1-aminonaphthalene-4-sulfonic acid-(2'-hydroxy)-propylamide. | 2-amino-1-hydroxy-benzene-4-sulfonic acid-(3'-methoxy)-propylamide→1-acetoacetylamino-dodecane. | Do. |
| 32 | 2-amino-1-hydroxy-4-chloro-6-nitrobenzene→2-aminonaphthalene-6-sulfonic acid-(2'-hydroxy)-propylamide. | 2-amino-1-hydroxy-benzene-4-sulfonic acid-(2'-hydroxy)-propylamide→1-acetoacetylamino-octane. | Do. |
| 33 | 2-amino-1-hydroxy-4.6-dinitrobenzene→2-aminonaphthalene-6-sulfonic acid-(2'-hydroxy)-propylamide. | 2-amino-1-hydroxy-benzene-4-sulfonic acid-(2'-ethoxy)-ethylamide→1-acetoacetyl-aminododecane. | Olive. |
| 34 | 2-amino-1-hydroxy-4-chloro-5-nitrobenzene→2-aminonaphthalene-6-sulfonic acid-(2'-hydroxy)-propylamide. | 2-amino-1-hydroxy-benzene-4-sulfonic acid-di-(2'-hydroxyethyl)-amide→1-acetoacetylamino-2-ethyl-hexane. | Do. |
| 35 | 2-amino-1-hydroxy-4-nitro-6-methylbenzene→1-aminonaphthalene-4-sulfonic acid-(2'-hydroxy)-propylamide. | 2-amino-1-hydroxy-benzene-4-sulfonic acid amide→1-acetoacetylamino-2-ethylhexane. | Do. |
| 36 | 2-amino-1-hydroxy-5-nitrobenzene→2-methylaminonaphthalene-6-sulfonic acid-(2'-hydroxy)propylamide. | do | Green. |
| 37 | 2-amino-1-hydroxy-4-nitro-6-chlorobenzene→1-aminonaphthalene-5-sulfonic acid-(3'-methoxy)-propylamide. | 2-amino-1-hydroxy-benzene-4-sulfonic acid amide→1-acetoacetylamino-octane. | Olive. |
| 38 | 2-amino-1-hydroxy-5-nitrobenzene→1-aminonaphthalene-4-sulfonic acid-(2'-hydroxy)-propylamide. | 2-amino-1-hydroxy-6-methylbenzene-4-sulfonic acid amide→1-acetoacetylamino-hexane. | Green. |
| 39 | do | 2-amino-1-hydroxy-6-acetylaminobenzene-4-sulfonic acid amide→1-acetoacetylamino-hexane. | Do. |
| 40 | do | 2-amino-1-hydroxy-benzene-4-sulfonic acid cyclohexylamide→1-acetoacetylamino-octane. | Do. |
| 41 | 2-amino-1-hydroxy-4-chloro-6-nitrobenzene→2-aminonaphthalene-6-sulfonic acid-(2'-hydroxy)-propylamide. | 2-amino-1-hydroxy-benzene-4-sulfonic acid benzylamide→1-acetoacetylamino-hexane. | Olive-green. |
| 42 | do | 2-amino-1-hydroxy-benzene-4-sulfonic acid phenylamide→1-acetoacetylamino-hexane. | Do. |
| 43 | do | 2-amino-1-hydroxy-benzene-4-sulfonic acid-(4'-methyl)-phenylamide→1-acetoacetylamino-hexane. | Do. |
| 44 | do | 2-amino-1-hydroxy-benzene-4-sulfonic acid pyrrolidide→1-acetoacetylamino-hexane. | Do. |
| 45 | 2-amino-1-hydroxy-4-chloro-6-nitrobenzene→2-aminonaphthalene-6-sulfonic acid-(2'-hydroxy)-propylamide. | 2-amino-1-hydroxy-benzene-4-sulfonic acid morpholide→1-acetoacetylamino-hexane. | Olive-green. |
| 46 | 2-amino-1-hydroxy-5-nitrobenzene→1-aminonaphthalene-5-sulfonic acid (3'-methoxy)-propylamide. | 2-amino-1-hydroxy-benzene-4-sulfonic acid amide→1-benzoylacetylamino-octane. | Green. |
| 47 | do | 2-amino-1-hydroxy-benzene-4-sulfonic acid amide→mixture of 75% 1-acetoacetyl-amino-octane+25% 1-acetoacetylamino-octadecane. | Do. |
| 48 | 2-amino-1-hydroxy-5-nitrobenzene→2-aminonaphthalene-sulfonic acid-(2'-hydroxy)-propylamide. | 2-amino-1-hydroxy-4-methylsulfonylbenzene→1-acetoacetyl-aminohexane. | Do. |
| 49 | do | 2-amino-1-hydroxy-4-ethysulfonylbenzene→1-acetoacetylamino-hexane. | Do. |

The following are the formulae of a representative product of the foregoing examples:

EXAMPLE 29

A mixture of cobaltiferous azo dyestuffs which correspond to the formulae

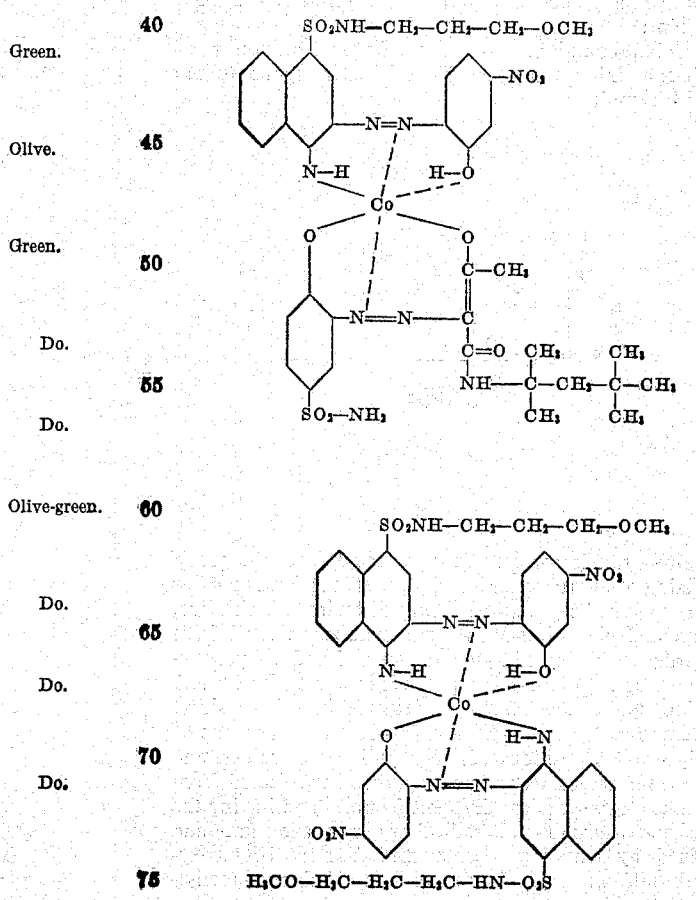

and

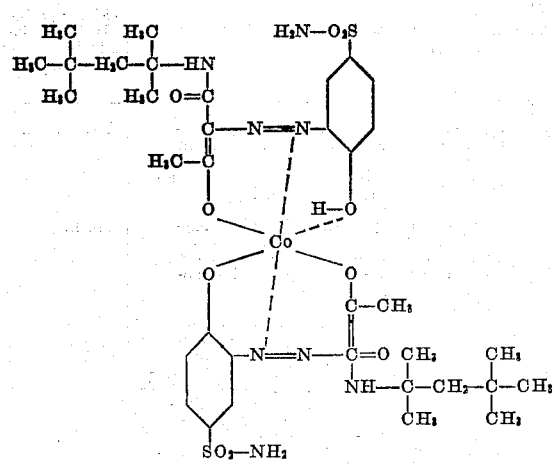

EXAMPLE 50

1 part of Glauber's salt and 0.2 part of the cobaltiferous azo dyestuff obtained according to the procedure described in Example 7 are dissolved in 500 parts of water. 10 parts of wool, previously wetted out, are entered into the dyebath at 30° and the bath raised to 100° in the course of 15 minutes. The temperature of the bath is maintained at 100° for 60 minutes; during the dyeing process 0.2 part of concentrated acetic acid are gradually added. On completion of dyeing the wool, dyed in a blue shade, is rinsed with water and dried.

Synthetic polyamide fibres are dyed in the same way; silk is dyed at somewhat lower temperatures, e. g. at 95°.

I claim:

1. Cobalt-containing azo dyestuffs and mixtures of cobalt-containing azo dyestuffs which correspond to the general formula

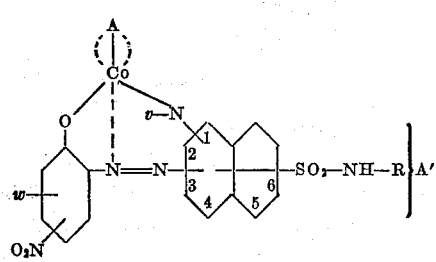

wherein $v$ stands for a member selected from the group consisting of hydrogen and methyl, $w$ stands for a member selected from the group consisting of hydrogen, chlorine, methyl and nitro, R stands for a member selected from the group consisting of 3'-methoxypropyl and 2'-hydroxypropyl, wherein the —N—$v$ group is in one of the 1 and 2 positions of the naphthalene nucleus and in ortho-position to the azo group, the —SO₂—NH—R group is in one of the 4, 5 and 6 positions of the naphthalene nucleus, and wherein the radical A stands for a member selected from the radical A', a radical different from A' and having the same general formula, the radical of a monoazo compound obtained by coupling a diazotized 2-amino-1-hydroxybenzenesulfonic acid amide with 2-(3'-chloro–phenyl-aminonaphthalene, and the radical of a monoazo compound of the general formula

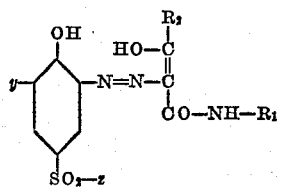

wherein $y$ stands for a member selected from the group consisting of hydrogen, methyl and acetylamino, $z$ stands for a member selected from the group consisting of lower alkyl, amino, lower alkylamino, lower hydroxyalkylamino, lower alkoxyalkylamino, cycloalkylamino, lower aralkylamino, mononuclear arylamino, lower dihydroxyalkylamino, morpholino and piperidino radicals, $R_1$ stands for an alkyl radical containing from 6 up to 18 carbon atoms, and wherein $R_2$ stands for a member selected from the group consisting of acetyl and benzoyl.

2. A cobalt-containing azo dyestuff which corresponds to the formula

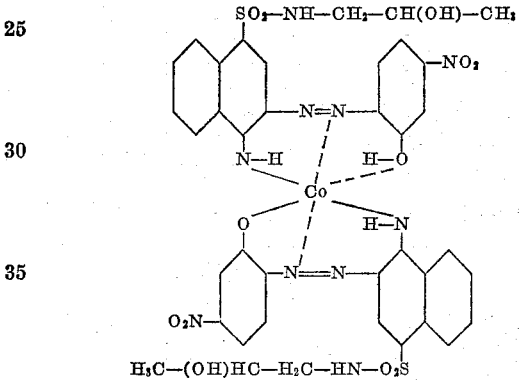

3. A mixture of cobalt-containing azo dyestuffs which correspond to the formulae

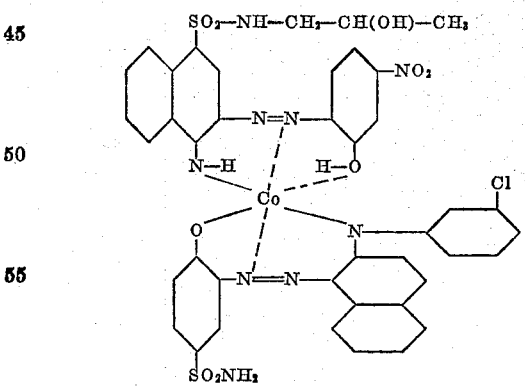

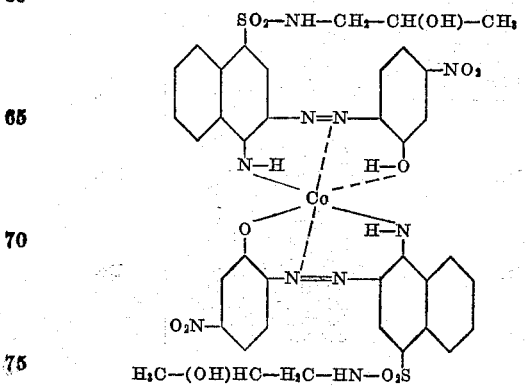

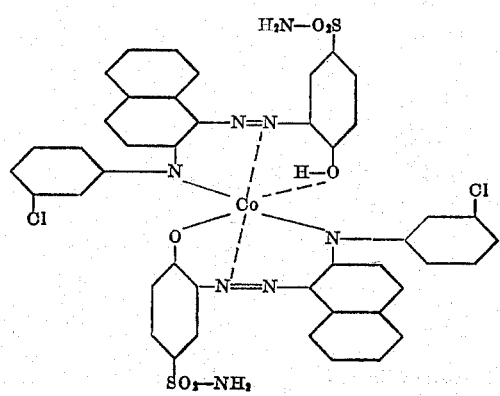
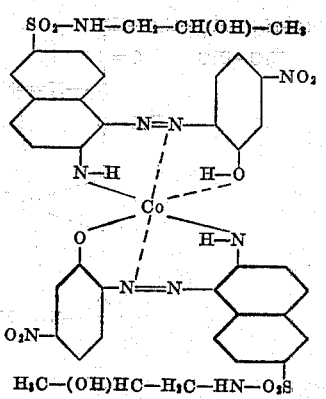
4. A mixture of cobalt-containing azo dyestuffs which correspond to the formulae
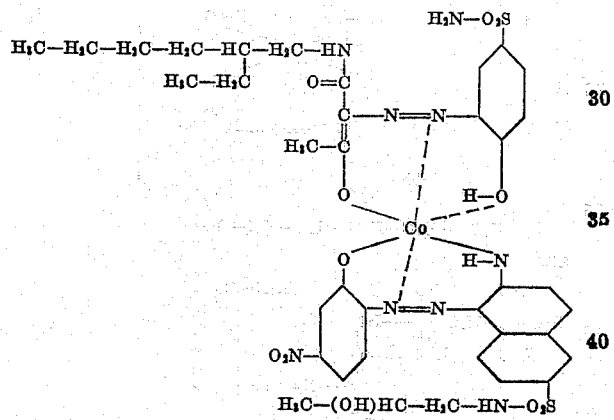
5. A mixture of cobalt-containing azo dyestuffs which correspond to the formulae
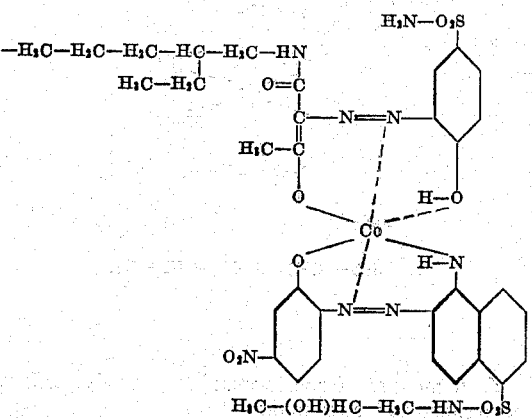
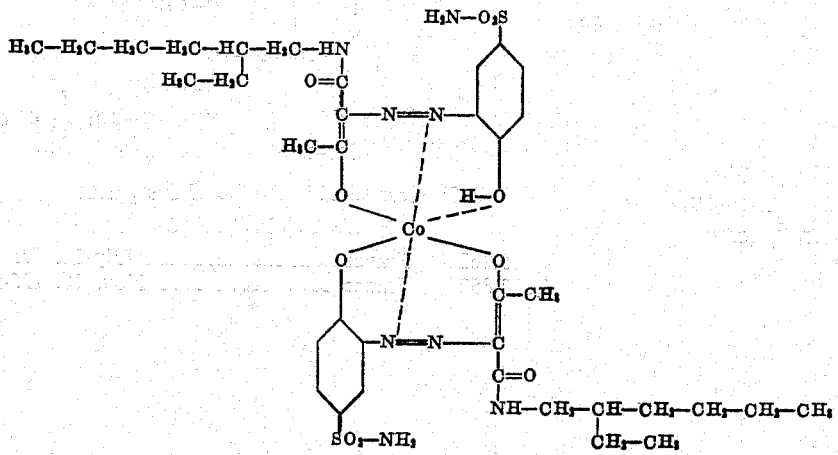

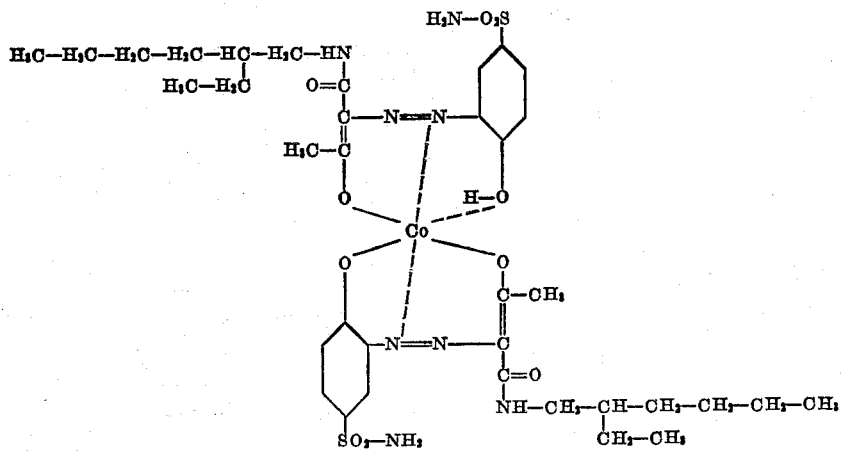
and
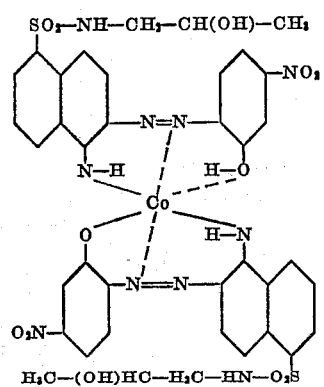
6. A mixture of cobalt-containing azo dyestuffs which correspond to the formulae
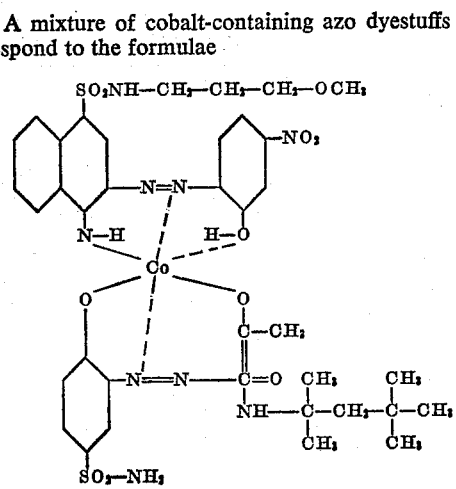
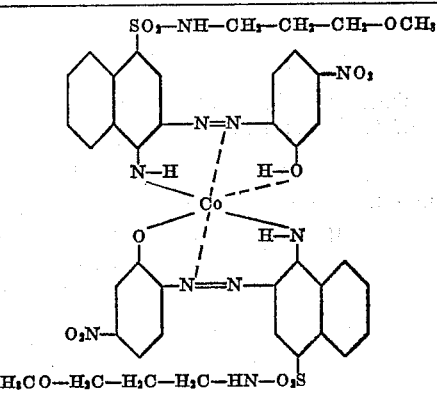
and
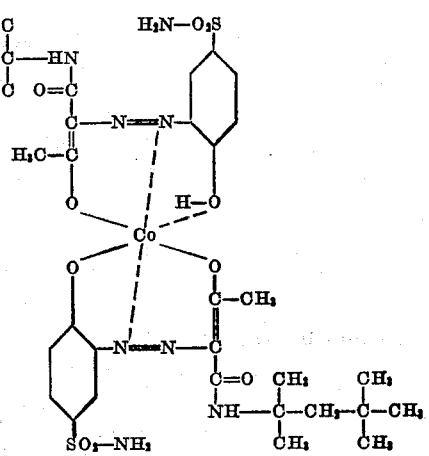
References Cited in the file of this patent
FOREIGN PATENTS
1,085,262 France _____ July 21, 1954
1,092,850 France _____ Nov. 10, 1954